(12) United States Patent
Roberts et al.

(10) Patent No.: US 8,336,571 B2
(45) Date of Patent: Dec. 25, 2012

(54) OVERPRESSURE SHUTOFF AND RELIEF VALVE ASSEMBLY

(75) Inventors: Kenneth Roberts, Phoenix, AZ (US); Gary Graham, Tempe, AZ (US); Todd Garrod, Tempe, AZ (US); David Segura, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 445 days.

(21) Appl. No.: 12/473,054

(22) Filed: May 27, 2009

(65) Prior Publication Data
US 2010/0300566 A1 Dec. 2, 2010

(51) Int. Cl.
*G05D 7/00* (2006.01)

(52) U.S. Cl. ............. 137/102; 137/115.14; 137/115.15; 137/116.3

(58) Field of Classification Search .......... 137/102, 137/115.03, 115.04, 115.05, 115.06, 115.08, 137/115.09, 115.14, 116.3, 118.01, 118.04, 137/119.01, 109, 115.13, 115.15, 115.26, 137/119.03
See application file for complete search history.

(56) References Cited

U.S. PATENT DOCUMENTS

| | | | | |
|---|---|---|---|---|
| 2,764,175 A | * | 9/1956 | Mercier et al. | 137/109 |
| 3,217,732 A | * | 11/1965 | Haugeland | 137/115.08 |
| 3,707,981 A | * | 1/1973 | Sadler et al. | 137/115.16 |
| 4,287,906 A | * | 9/1981 | Green et al. | 137/118.02 |
| 4,303,088 A | * | 12/1981 | Green et al. | 137/102 |
| 4,557,180 A | * | 12/1985 | Glomeau | 91/446 |
| 4,696,162 A | | 9/1987 | Williams | |
| 5,472,009 A | * | 12/1995 | Linderoth | 137/101 |
| 5,743,286 A | * | 4/1998 | Ko | 137/119.04 |
| 6,065,497 A | | 5/2000 | Tsou | |
| 6,263,969 B1 | * | 7/2001 | Stoesz et al. | 166/334.4 |
| 6,789,574 B2 | | 9/2004 | Tsou | |
| 2004/0011407 A1 | * | 1/2004 | Fisher | 137/541 |

FOREIGN PATENT DOCUMENTS

JP 2003222263 A 8/2003

* cited by examiner

*Primary Examiner* — Craig Schneider
*Assistant Examiner* — Kevin Murphy
(74) *Attorney, Agent, or Firm* — Ingrassia Fisher & Lorenz, P.C.

(57) ABSTRACT

A valve assembly is provided. The valve assembly comprises a housing having an inlet, a first outlet, and a passageway extending therebetween, the passageway having a first inner diameter at the inlet and a second inner diameter at the first outlet, a first poppet valve disposed in, and adapted to selectively seal, the inlet, a second poppet valve disposed in, and adapted to selectively seal, the first outlet, the second poppet valve coupled to the first poppet valve, and a biasing member coupled to the second poppet valve, the biasing member adapted to exert a force sealing the second poppet valve.

9 Claims, 6 Drawing Sheets

OVERPRESSURE SHUTOFF AND RELIEF VALVE ASSEMBLY

TECHNICAL FIELD

Embodiments of the subject matter described herein relate generally to valve assemblies. More particularly, embodiments of the subject matter relate to overpressure shutoff poppet valves.

BACKGROUND

During operation of some systems, such as aircraft engine systems, high pressure fluid is generated in one portion of the system and transferred through one or more conduits for use in other portions of the system. The high pressure fluid, which can be a gas such as air, is frequently useful at lower pressures than that at which it is generated. Commonly, the portions of the system using the lower-pressure fluid perform with decreased effectiveness or efficiency if supplied with fluid at the higher, generated pressure. For this reason, pressure regulators or other devices are frequently used to adjust the pressure of the fluid supplied to the low-pressure portions of the system.

Shutoff valves are commonly used to prevent high-pressure fluid from unexpectedly entering low-pressure systems. Typically, such valves operate in an open position, and close in response to detection of presence of fluid pressure above a predetermined value. Such shutoff valves have inherent complications which may hinder their performance. For example, a failure to accurately detect unacceptably high fluid pressure can cause the shutoff valve to remain open when it should be closed. Additionally, actuators operating the shutoff valves may fail to adjust the valve to a closed position at a critical time. Moreover, when a shutoff valve correctly operates, some high pressure fluid has already entered the low pressure portions of the system. With the valve closed, in some cases, the high pressure fluid is retained in the low pressure system, which is undesirable. Finally, when the pressure in the fluid decreases to an acceptable level, the shutoff valve may remain in the closed position and require external intervention to reopen it. Together with the previous possible complications, it is possible for a shutoff valve to remain in a closed position when it should be open, inhibiting fluid from flowing when it should.

BRIEF SUMMARY

A valve assembly is provided. The valve assembly comprises a housing having an inlet, a first outlet, and a passageway extending therebetween, the passageway having a first inner diameter at the inlet and a second inner diameter at the first outlet, a first poppet valve disposed in, and adapted to selectively seal, the inlet, a second poppet valve disposed in, and adapted to selectively seal, the first outlet, the second poppet valve coupled to the first poppet valve, and a biasing member coupled to the second poppet valve, the biasing member adapted to exert a force sealing the second poppet valve.

Another valve assembly is also provided. The valve assembly comprises a housing having an inlet, a first outlet, and a passageway extending therebetween, the passageway having a first inner diameter at the inlet and a second inner diameter at the first outlet, a first poppet valve disposed in, and adapted to selectively seal, the inlet, a second poppet valve disposed in, and adapted to selectively seal, the first outlet, a rigid stem coupled to the first poppet valve and the second poppet valve, the stem extending through the passageway, and a biasing member coupled to the second poppet valve, the biasing member adapted to exert a force sealing the second poppet valve.

Another valve assembly is provided. The valve assembly comprises a housing having an inlet with a substantially circular shape, a first outlet with a substantially circular shape, and a passageway extending therebetween, the passageway having a first inner diameter at the inlet and a second inner diameter at the first outlet, the first inner diameter larger than the second inner diameter, a first poppet valve disposed in, and adapted to selectively seal, the inlet, a second poppet valve disposed in, and adapted to selectively seal, the first outlet, a rigid valve stem coupled to the first poppet valve and the second poppet valve, the valve stem extending through the passageway, and a biasing member coupled to the second poppet valve, the biasing member adapted to exert a force sealing the second poppet valve in the first outlet and opening the first poppet valve in the inlet.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
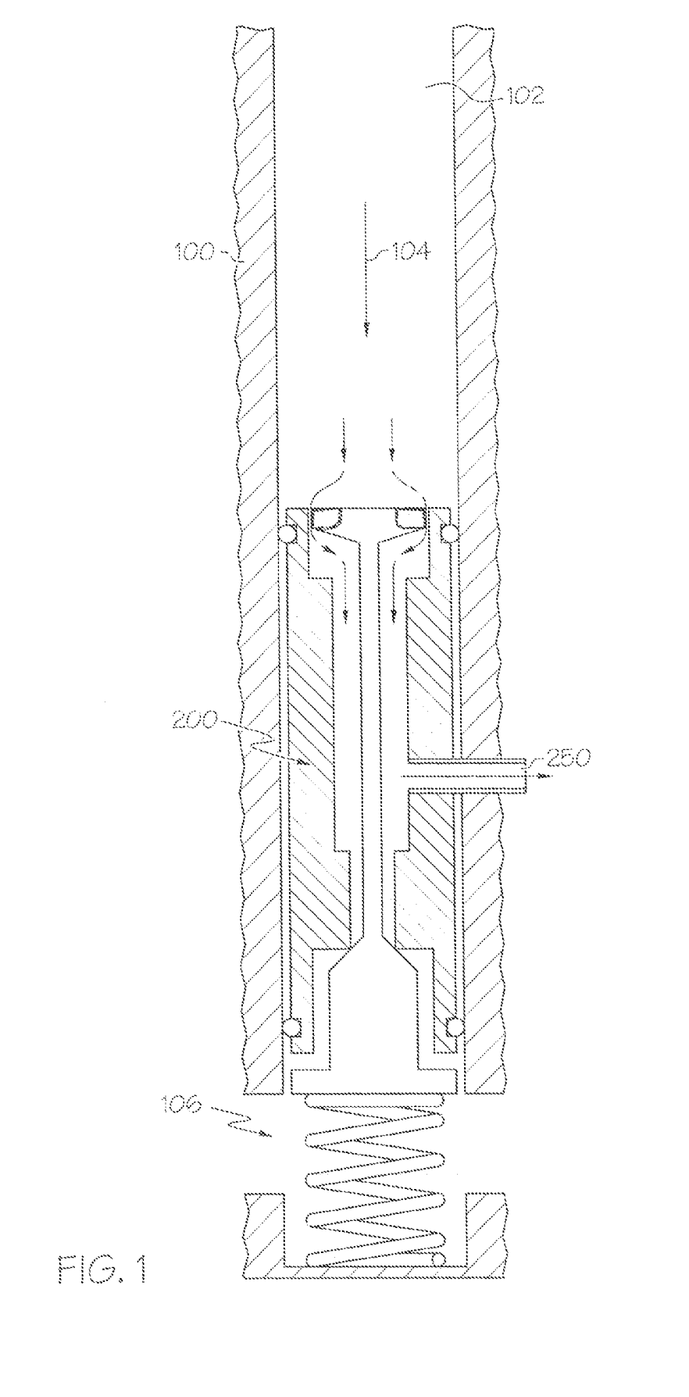
FIG. 1 is a partial cross-sectional view of a valve assembly in a fluid transfer system.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically, so as to exert mutual influence therebetween. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made and describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

A dual-poppet valve assembly preloaded with a spring can function as a cutoff and relief valve without relying on sensors or actuators beyond the valve components. By positioning the dual-poppet assembly within a housing where the relief poppet valve has a smaller valve area than the inlet poppet valve, the valve assembly can operate to close the inlet poppet valve when the pressure exceeds a predetermined amount, configurable through preloading by a spring reacting against the relief poppet valve. Additionally, the dual-poppet nature allows for two openings, permitting fluid which entered the valve assembly during the overpressure to exit the valve assembly through a relief conduit, thereby shunting it away from any components for which exposure only to low-pressure fluids is desirable. After an overpressure ends, the valve assembly will return to its original state, again without adjustment by external components.

FIG. 1 illustrates a cross-sectional view of a shutoff and relief valve assembly 200 disposed in a conduit 100. The conduit 100 has a supply portion 102, though which fluid is flowing into the valve assembly 200, as indicated by arrow 104. The fluid flows through the valve assembly 200 and out through an outlet or side port 250. The side port 250 can connect with another conduit, a separate component, or any other fluid receptacle desired. Each valve assembly 200 can have one or more side ports, without limitation. The valve assembly 200 is also in selective fluid communication with an exhaust portion 106 of the conduit 100 or another conduit. The exhaust portion 106, as described in greater detail below, is sealed by one portion of the valve assembly 200 and, in desired operational states, does not receive fluid from the supply portion 102.

Figure 2:
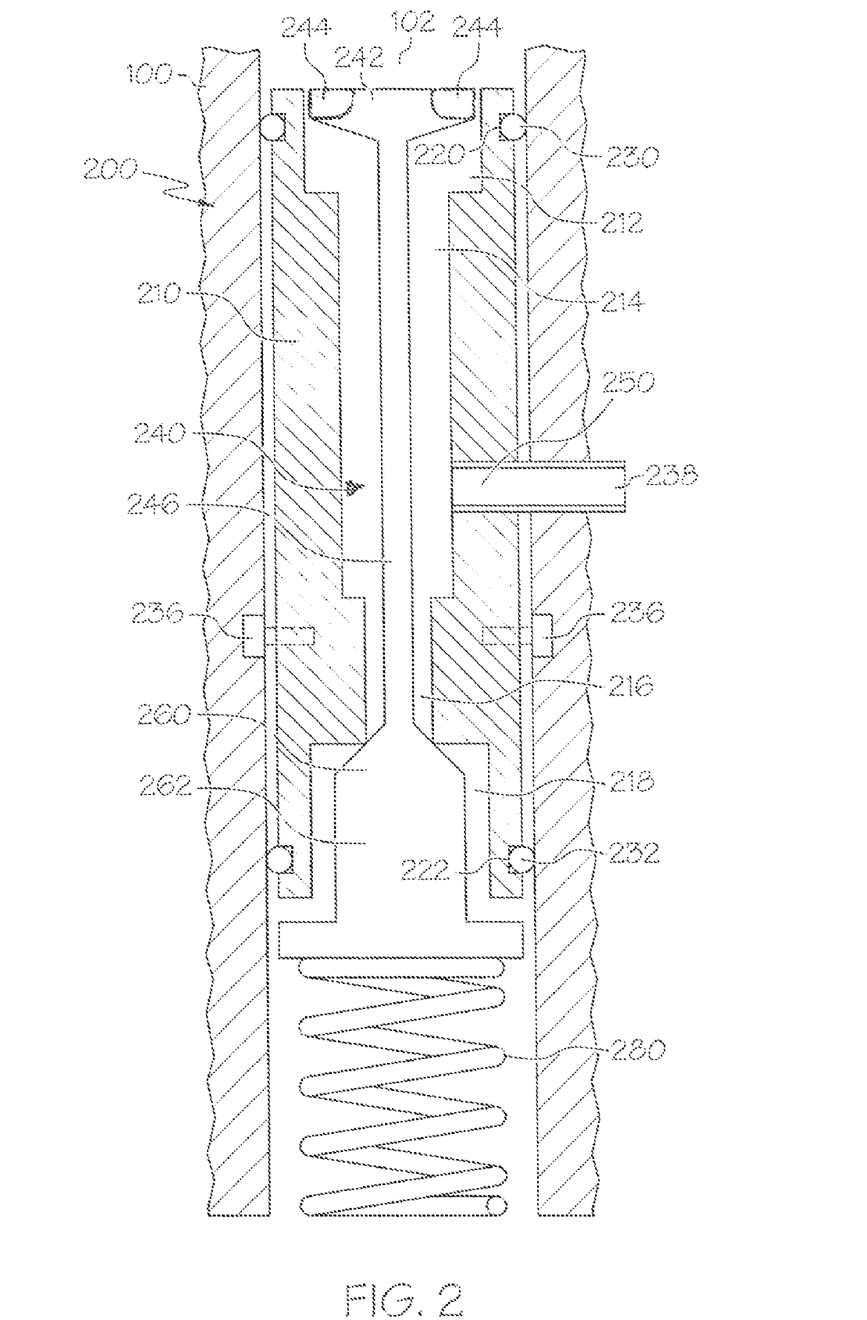
FIG. 2 is a detailed view of the valve assembly of FIG. 1.

FIG. 2 illustrates a detailed view of the valve assembly 200. The valve assembly 200 comprises a housing 210 and a poppet assembly 240. The housing 210 is disposed in the conduit 100 and surrounds the poppet assembly 240, although the poppet assembly 240 can extend beyond the boundaries of the housing 210. Although a single side port 250 is shown, as mentioned above, more can be present in various embodiments. In certain embodiments, the housing 210 can be omitted and the various functions, operations, and components described can be formed by internal surface features of the conduit 100.

The housing 210 comprises an inlet portion 212, a central portion 214, an exhaust portion 216, and a discharge portion 218. The housing 210 preferably occupied the complete flow pathway of the conduit 100, thereby forcing fluid flowing through the conduit 100 to flow through the valve assembly 200. For this reason, the housing 210 preferably has an outer shape matching the interior shape of the conduit 100. Thus, for those conduits with a circular cross-sectional shape, such as conduit 100, the housing 210 can have a circular outer shape. In other embodiments, the housing 210 can have a dissimilar shape than the interior of the conduit 100, but preferably a blocking member or other obstruction device inhibits fluid from flowing around the valve assembly 200.

The housing 210 is preferably composed of a corrosion-resistant metal, such as a stainless steel or aluminum, or an alloy thereof, although other similar materials can be used, such as brass, titanium, ceramics or other composites, and so on, as desired for the embodiment. Preferably, the housing 210 is impervious to the fluid flowing through the valve assembly 200, thereby constraining the fluid from escaping the valve assembly 200 along an unintended path.

The interior of the housing 210 also preferably has a circular shape, although other shapes can also be used, so long as they operationally cooperate with the poppet assembly 240, as described below. The inner diameters of the inlet portion 212, the central portion 214, the exhaust portion 216, and the discharge portion 218 can all have different sizes, as illustrated below. Unless described and specifically recited, some, such as the inlet portion 212 and discharge portion 218 can have the same size. The exact measurement of each portion can vary between embodiments, and is not fixed. The operational relationships between the different portions and the poppet assembly 240 and conduit 100 described below are preferably preserved when selecting measurements.

The housing 210 can also have an inlet retention groove 220 and a discharge retention groove 222. Each groove 220, 222 is preferably an indentation inward along the outer surface of the housing 210. An inlet sealing ring 230 and a discharge sealing ring 232 are preferably disposed in each of the inlet retention groove 220 and discharge retention groove 222, respectively. The inlet and discharge sealing rings 230, 232 are preferably sealing members of an O-ring type which inhibit fluid from flowing around the housing 210 and past the valve assembly 200. The inlet and discharge sealing rings 230, 232 can be of any desired type, such as an elastomeric member, and preferably fluidly seal the space between the housing 210 and inner wall of the conduit 100. The exact size and position of the inlet and discharge retention grooves 220, 222 can vary to cooperate with the selected inlet and discharge sealing rings 230, 232, and vice versa, to accomplish the desired sealing operation.

The housing 210 can be positioned in the conduit 100 using any of a variety of techniques, some of which are illustrated for descriptive purposes in FIG. 2. For example, the housing 210 can be fastened to the conduit 100 using a threaded member, such as the bolts 236. The housing 210 can have one or more threaded holes in the outer surface to receive fasteners, such as the bolts 236. The positioning of the bolts 236 and any matching hole in the housing 210 can vary between embodiments, as best suited for the overall assembly of the system. Other techniques can also be employed, such as retaining tube 238. The retaining tube 238 can be a hollow, rigid tube positioned in the side port 250 and extending through the housing 210, thereby preventing movement of the housing 210 relative to the conduit, or rotation therein. The retaining tube 238 can have a cylindrical shape, other cross-sectional shape, but is preferably hollow to permit fluid to flow through the side port 250 and through the housing 210 and wall of the conduit 100 to any desired destination.

The inlet portion 212 of the housing 210 has a sufficiently large inner diameter to receive the inlet head 242 of the poppet assembly 240. The inlet portion 212 and inlet head 242 can cooperate in shape to constrain movement of the inlet head 242 and poppet assembly 240 through the housing 210, as described below.

The central portion 214 is the portion of the housing 210 between the inlet portion 212 and the exhaust portion 216. To cooperate with the inlet head 242, the central portion 214 preferably has a smaller inner diameter than the inlet portion 212. The central portion 214 can have one or more side ports 250 in any desired position to permit fluid which has entered the inlet portion 212 to exit the valve assembly 200. The side ports 250 can have any desired diameter and preferably extend entirely through the housing 210. The central portion 214 is also adjacent the exhaust portion 216.

The exhaust portion 216 preferably has a smaller inner diameter than the central portion 214. The exhaust portion 216, therefore, has a smaller inner diameter than the inlet portion 212, as well. The exhaust portion 216 provides a pathway through which fluid can contact the underside of the exhaust head 260 of the poppet assembly 240.

The discharge portion 218 contains the platform portion 262. Preferably, the discharge portion 218 has a larger inner diameter than the exhaust portion 216, to cooperate with the exhaust head 260. Any portion of the housing 210 can have additional features or components not described herein, without reducing the effectiveness of the embodiment for performing the operations described herein.

The poppet assembly 240 preferably comprises an inlet head 242, a poppet shaft 246, an exhaust head 260, and a platform portion 262. The inlet head 242 and exhaust head 260, together with the portion of the housing 210 against which they seal by contact, can be referred to as poppet valves individually. The inlet head 242 is coupled to the exhaust head 260 by the poppet shaft 246. The inlet head 242 and exhaust head 260 can be integrally formed with the poppet shaft 246, or can be coupled together using any desired technique, such as fastening, bonding, welding, brazing, and so on. As one example, the inlet head 242 can have a threaded rod extending from its underside and the poppet shaft 246 can have a threaded hole at one end, allowing the inlet head 242 to be screwed onto the poppet shaft 246. The exhaust head 260 can have a similar arrangement. Alternatively, the exhaust head can be integrally formed with the poppet shaft 246 independent of the technique used to couple the inlet head 242 to the poppet shaft 246, and vice versa. The platform portion 262 is coupled to the exhaust head 260. The exhaust head 260 and platform portion 262 can be integrally formed or separate components. The poppet assembly 240 is preferably composed of a corrosion-resistant metal, including those listed above for the housing 210. The housing 210 and poppet assembly 240 can be composed of the same or different metals.

Figure 3:
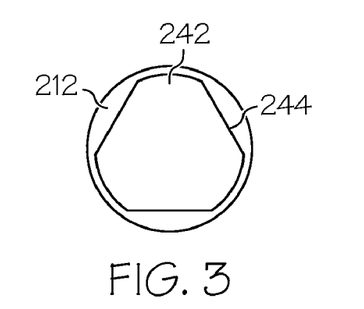
FIG. 3 is a top view of an embodiment of a valve assembly.
Figure 4:
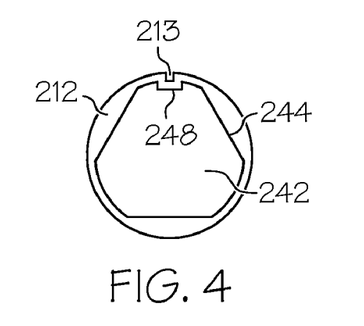
FIG. 4 is a top view of another embodiment of a valve assembly.
Figure 5:
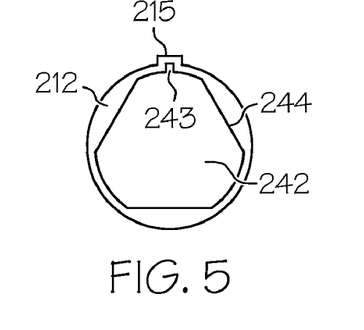
FIG. 5 is a top view of yet another embodiment of a valve assembly.

The inlet head 242 is disposed in the inlet portion 212 of the housing 210. The inlet head 242 can be positioned away from the corner of the housing 210 formed by the reduction in inner diameter between the inlet portion 212 and central portion 214 to seal the valve assembly 200, thereby preventing fluid from entering. Alternatively, the inlet head 242 can be positioned away from the corner of the housing 210, permitting fluid to flow around the inlet head 242 and into the central portion 214 of the housing 210. As can be seen, the inlet head 242 can have a substantially circular shape with one or more flat portions 244. The flat portions 244 can extend along chord lines around the overall circular shape of the inlet head 242. FIGS. 3-5 illustrate a top view of the inlet head 242, illustrating another view of the flat portions 244. When the inlet portion 212 has a circular shape, such as in the illustrated embodiment, the reduction of cross-sectional area resulting from the flat portions 244 permits fluid to flow past the upper surface of the inlet head 242 toward the central portion 214 of the housing 210.

The poppet stem or poppet shaft 246 is preferably a rigid body which extends between the inlet head 242 and the exhaust head 260, through the interior of the housing 210. Although depicted as cylindrical, the poppet shaft 246 can have any desired size or shape appropriate to the embodiment. The exhaust head 260 is preferably similar to the inlet head 242, having both a circular shape and one or more flat portions permitting fluid to flow around the exhaust head 260 through the discharge portion 218 of the housing 210. The exhaust head 260 can be positioned against the corner formed by the expansion from the exhaust portion 216 to the discharge portion 218, inhibiting fluid from flowing past it.

The poppet assembly 240 is preferably positionable between two mutually exclusive locations. In the first location, the illustrated configuration, the exhaust head 260 is disposed against the housing, inhibiting fluid from flowing out of the valve assembly 200. Fluid can, however, enter the housing 210 through the inlet portion 212 by flowing around the inlet head 242. From there, the fluid can exit through the side port 250. In another position, later illustrated and described below, the poppet assembly 240 is positioned in the second location, wherein the inlet head 242 is contacting the housing 210, inhibiting fluid from flowing into the valve assembly 200. At the same time, the exhaust head 260 is positioned away from the exhaust portion 216 of the housing 210, and fluid can exit from within the housing 210 out through the discharge portion 218. When the fluid in the discharge portion 218 is at a lower pressure than that in the side port 250, fluid can flow back through the central portion 214 from the side port 250 and past the exhaust head 260 to exit through the discharge portion 218.

The platform portion 262 is preferably coupled to a resilient member, such as the spring 280. As shown in FIG. 1, the spring 280 preferably reacts against another surface, such as the one below the exhaust portion 216 of the housing. The resilient member can be a helical spring, as shown, or a linear spring, or any other biasing member, which exerts a force against the platform portion 262, directed to position the exhaust head 260 into the closed position illustrated in FIG. 2. Preferably, the force is exerted linearly along the long axis of the poppet assembly 240. The amount of force exerted by the spring 280 can be adjusted by selecting the stiffness of the spring, as well as adjusting the amount of compression of the spring between the platform portion 262 and the surface against which it reacts. In this way, the amount of fluid pressure within the valve assembly 200 required to open the exhaust head 260 can be adjusted.

FIGS. 3-5 illustrate top views of several non-limiting embodiments of the inlet portion 212 and inlet head 242. FIG. 3 illustrates an inlet head 242 with three flat portions 244, though more or fewer can be present in various embodiments. FIG. 4 illustrates a similar embodiment, wherein the inlet head 242 additionally comprises a groove 248 and the inlet portion 212 comprises a guide or protrusion 213. The protrusion 213 is disposed in the groove 248 for guiding motion of the inlet head 242 within the inlet portion 212. Accordingly, the protrusion 213 can extend along the interior surface of the inlet portion 212 to guide the inlet head 242 as it moves in the inlet portion 212. FIG. 5 illustrates a reverse situation, wherein the protrusion 243 is formed on the inlet head 242, and the groove 215 extends along the inner surface of the inlet portion 212 to guide the inlet head 242.

Figure 6:
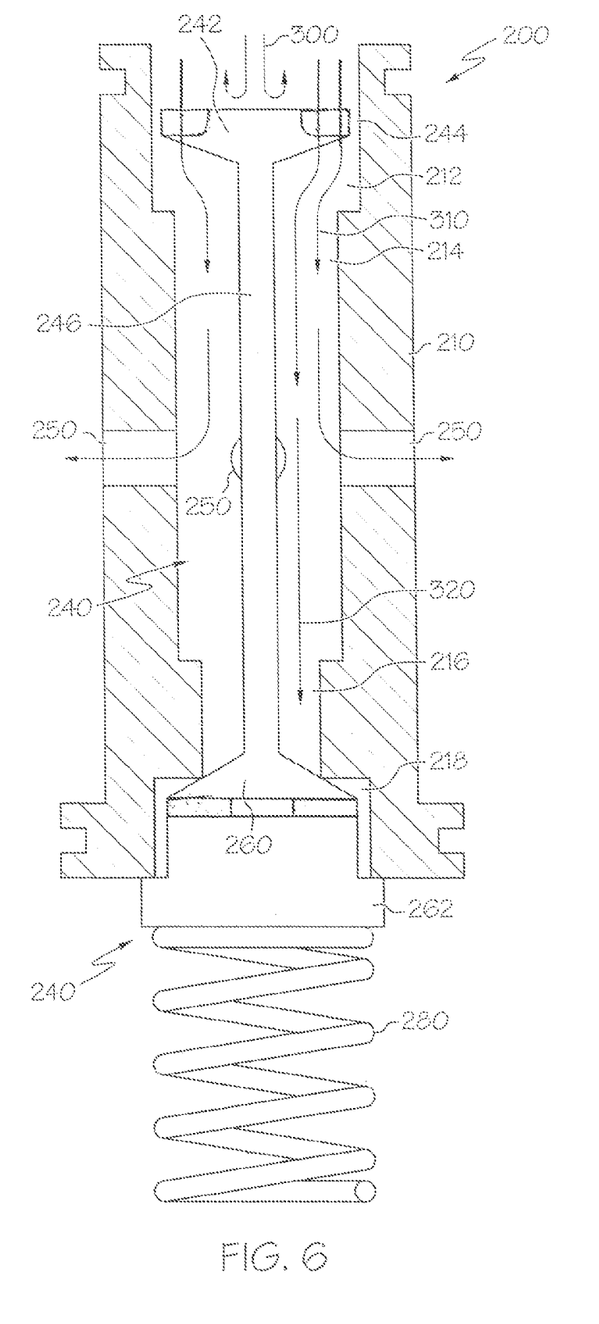
FIG. 6 is a partial cross-sectional view of a valve assembly in a first position.
Figure 7:
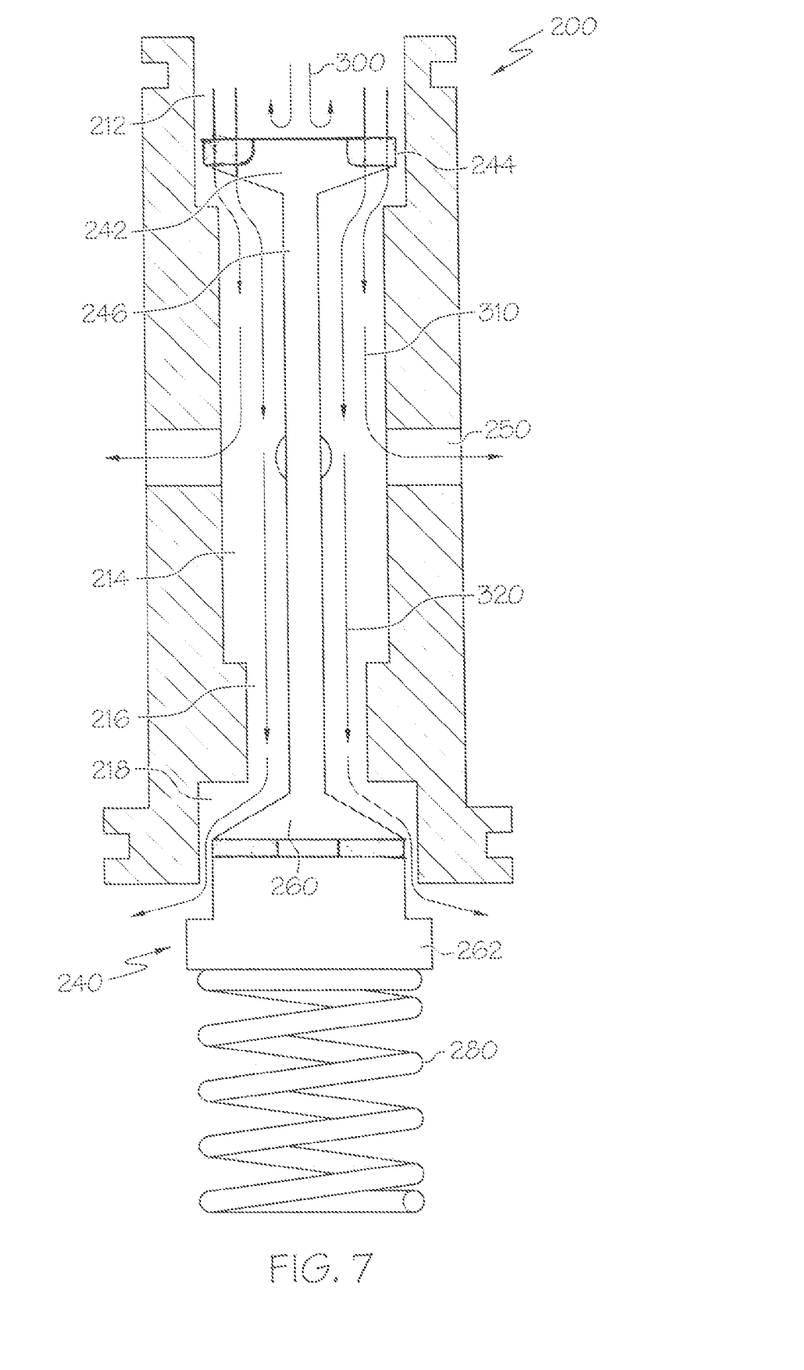
FIG. 7 is a partial cross-sectional view of the valve assembly of FIG. 6 in a second position.
Figure 8:
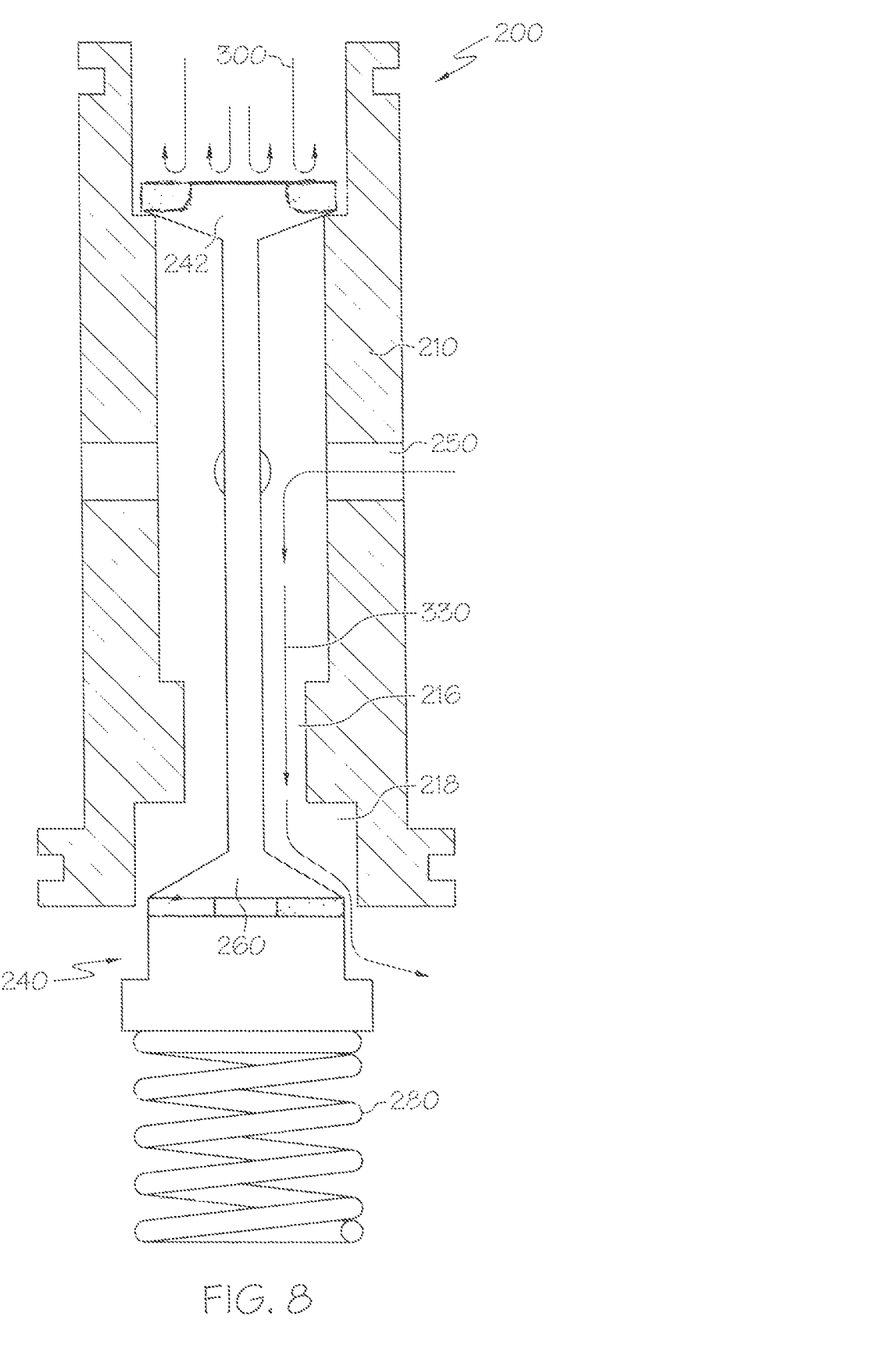
FIG. 8 is a partial cross-sectional view of the valve assembly of FIG. 6 in a third position.

FIGS. 6-8 illustrate an embodiment of the valve assembly 200 in two different operational positions occurring during shutoff and relief operation, as well as a transition position between the two operational positions. FIG. 6 illustrates the valve assembly 200 in the open position, wherein fluid enters through the inlet portion 212 and exits through the side port 250. FIG. 7 illustrates the valve assembly 200 in a position during the transition from the open position to the closed position. FIG. 8 illustrates the valve assembly 200 in the closed or shutoff position, wherein fluid is inhibited from entering the valve assembly 200 through the inlet portion 212, and fluid can flow from a side port 250 to the discharge portion 218 past the exhaust head 260.

As shown in FIG. 6, fluid can enter the housing 210 through the inlet portion 212 when the poppet assembly 240 is in the open position. In the open position, the inlet head 242 is positioned away from the housing 210, permitting fluid to flow past it. The fluid, indicated by arrow 310, can flow through the central portion 214 and out through the side port 250. Additionally, fluid, indicated by arrow 300, will also exert pressure against the outward face of the inlet head 242. Finally, some fluid, indicated by arrow 320, will flow past the side port 250 to exert pressure against the underside of the exhaust head 260. The exhaust head 260 is maintained in place by the spring 280 exerting force against the platform portion 262.

It is desirable for a shutoff valve to inhibit fluid from flowing through the valve once the pressure of the flowing fluid exceeds a predetermined value. Accordingly, once the pressure of the fluid flowing through the valve assembly 200 exceeds a predetermined value, the force exerted against the platform portion 262 by the spring 280 will be insufficient to maintain the open position of the poppet assembly 240. Once the pressure exceeds the critical value, the poppet assembly 240 will shift downward within the illustrated reference frame.

FIG. 7 illustrates the valve assembly 200 in a transitory position between the open and closed positions. Because the inner diameter of the exhaust portion 216 is smaller than the inner diameter of the inlet portion 212 and central portion 214, and the outer diameter of the inlet head 242, when the same pressure is present in all three portions, the force exerted against the exhaust head 262 is slightly higher than that exerted against the inlet head 242. Accordingly, once the pressure has exceed the critical predetermined value, and the poppet assembly 240 is moving from the open position of FIG. 6 to the closed position of FIG. 8, the poppet assembly 240 will continue to move as caused by the increased force.

Thus, once the poppet assembly 240 has completed repositioning to the closed position, it will appear as illustrated in FIG. 8. As can be seen by the fluid indicated by arrow 300, fluid is inhibited from entering the housing 210 of the valve assembly 200 by positioning of the inlet head against the housing 210. This is the shutoff feature of the valve assembly 200, which inhibits fluid from flowing through the side port(s) 250 to other, potentially delicate components, once the pressure exceeds the critical amount.

Additionally, because the exhaust head 260 has moved away from the housing 210, permitting fluid to flow from the exhaust portion 216 through the discharge portion 218. Accordingly, should fluid be at a higher pressure within the housing 210, including within components fluidly connected to the interior of the housing through the side port 250, than the region of the discharge portion 218, fluid can flow out of the housing (and fluid port 250), and exit the valve assembly 200. This is the relief feature of the valve, and can reduce the downstream pressure immediately following an overpressure causing the shutoff operation of the valve assembly 200.

Once the pressure against the inlet head 242 decreases below the critical, predetermined pressure, the force exerted by the spring 280 will overcome the resistive pressure force and adjust the position of poppet assembly 240 to the open position. Such a transition occurs in the reverse of the described closing operation, resulting in the open valve position shown in FIG. 6. Accordingly, the valve assembly 200 can close to shutoff fluid flow in the event of an overpressure, relieve high pressure within the valve assembly after an overpressure, and return to an open position after removal of the excessive pressure without the use of external reset, sensors, or actuators.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. A valve assembly comprising:
   a housing having an inlet, a first outlet, a second outlet, and a passageway extending between the inlet and the first outlet, the second outlet extending through the housing between the inlet and the first outlet, the passageway having a first inner diameter at the inlet, a second inner diameter at the first outlet, and a third inner diameter along the passageway, the first inner diameter larger than the third inner diameter to thereby form a first poppet valve seat in the housing between the inlet and the passageway, the third inner diameter larger than the second inner diameter to thereby form a second poppet valve seat in the housing between the first outlet and the passageway; and
   a poppet assembly disposed within the housing and movable between an open position, in which the inlet is in fluid communication with the second outlet and is fluidly isolated from the first outlet, and a closed position, in which the inlet is fluidly isolated from the first and second outlets and first and second outlets are in fluid communication, the poppet assembly comprising:

a first poppet valve disposed within the inlet, the first poppet contacting the first poppet valve seat to thereby seal the inlet when the poppet assembly is in the closed position, and not contacting the first poppet valve seat to thereby unseal the inlet when the poppet assembly is in the open position, a second poppet valve disposed within the first outlet, the second poppet valve contacting the second poppet valve seat to thereby seal the first outlet when the poppet assembly is in the open position, and not contacting the second poppet valve seat to thereby unseal the first outlet when the poppet assembly is in the closed position, a rigid stem coupled to the first poppet valve and the second poppet valve, the stem extending through the passageway, and a biasing member coupled to the second poppet valve, the biasing member adapted to exert a force on the second poppet valve that urges the poppet assembly toward the open position, wherein the first poppet valve, the second poppet valve, and the biasing member are dimensioned and configured such that the poppet assembly moves from (i) the open position to the closed position in response to fluid pressure at the inlet exceeding a predetermined pressure and (ii) from the closed position back to the open position in response to fluid pressure at the inlet decreasing below the predetermined pressure.

2. The valve assembly of claim 1, further comprising a tube within the second outlet and extending outward from the housing.

3. The valve assembly of claim 1, wherein the housing has an outer surface and further comprises a threaded hole in the outer surface, the threaded hole adapted to receive a fastening member.

4. The valve assembly of claim 1, wherein the housing comprises a corrosion-resistant metal.

5. The valve assembly of claim 1, wherein the housing comprises stainless steel.

6. The valve assembly of claim 1, wherein the housing has an outer surface, the outer surface comprising a groove substantially surrounding the inlet.

7. The valve assembly of claim 6, further comprising a sealing member disposed in the groove.

8. The valve assembly of claim 1, wherein the first poppet valve comprises a first poppet head having a guide shape.

9. The valve assembly of claim 8, wherein the inlet has a shape adapted to receive the guide shape of the first poppet head.

* * * * *